Figure 1:
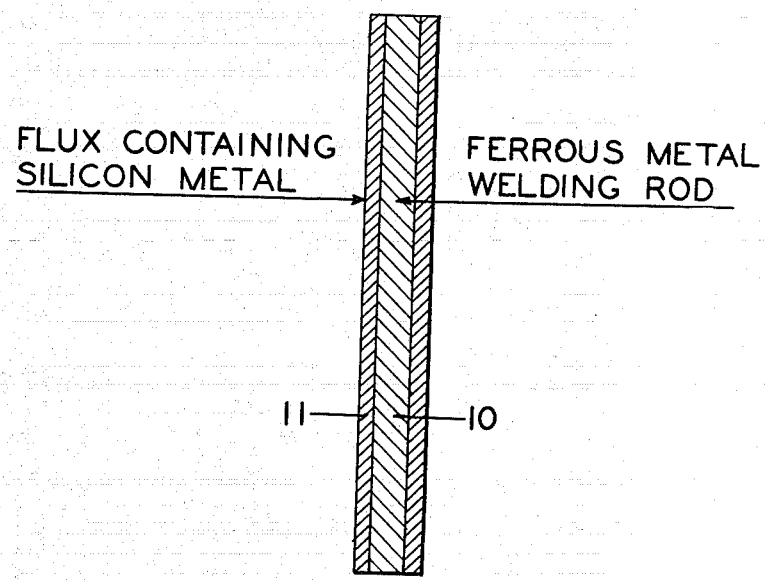

Jan. 12, 1937.   R. FRANKS   2,067,630
WELDING ROD
Filed July 28, 1934

INVENTOR
RUSSELL FRANKS
BY
ATTORNEY

UNITED STATES PATENT OFFICE 2,067,630

WELDING ROD

Russell Franks, Jackson Heights, N. Y., assignor, by mesne assignments, to Union Carbide and Carbon Corporation, a corporation of New York Application July 28, 1934, Serial No. 737,384

4 Claims. (Cl. 219—8)

The invention relates to welding and refers specifically to welding rods coated with a flux containing metallic silicon.

Application Serial Number 593,928, filed February 18, 1932, by Frederick M. Becket and Russell Franks jointly, describes chromium-nickel steels containing additions of columbium and/or tantalum acting to lessen materially loss of corrosion resistance on prolonged holding at elevated temperatures in the neighborhood of 500° C. Patent No. 1,954,344, issued to Frederick M. Becket and Russell Franks, describes chromium steels containing additions of columbium, with or without tantalum, acting to lessen materially the hardness or hardenability of the steels. In both of these types of steels it is important that the ratio of columbium to carbon be maintained within a relatively narrow range in order to develop the valuable properties of the materials.

The widest commercial application of the above types of steels cannot be attained unless there is available a satisfactory flux or flux coated welding rod for welding them. It is an object of this invention to provide such a flux and flux coated welding rod.

I have found that weld filler material containing columbium tends to lose excessive amounts of this constituent when melted by an oxyacetylene torch or an electric arc during welding operations unless the material contains an effective amount of silicon. The following table (A) of test data serves to illustrate this fact. The welds in these tests were made in twelve-gage sheet with one-eighth inch welding rods, using both the electric arc and the oxyacetylene torch methods. A suitable flux, containing no uncombined metal, was employed.

of the rod was increased to about 0.7% or more, less than 10% of the columbium in the rod was lost.

In Patent 2,056,765, issued October 6, 1936 to Frederick M. Becket and Russell Franks, and copending application Serial No. 737,386, filed July 28, 1934, by Frederick M. Becket and Russell Franks jointly, are described the benefits to be derived from the inclusion of suitable amounts of silicon in the body of the rod as an alloyed constituent. While this expedient is a satisfactory solution of the problem under many circumstances, it will not always be desirable to add sufficient silicon in this manner to obtain the desired percentage recovery of columbium. It is an object of the present invention to provide another and somewhat more flexible way to utilize the desired protective action of silicon.

The invention is a welding flux containing metallic silicon or silicon alloy, and a welding rod provided with a coating comprising a silicon-containing flux.

The silicon is preferably rather finely comminuted, and may be in the form of metallic silicon, or ferro-silicon or other silicon alloy. Slag-forming materials other than metallic silicon, for example metal oxides, silicates, fluorides, borates, and/or carbonates, and/or a binder, for example dextrine or a soluble silicate or silicon ester, may also be incorporated in the flux.

Figure 2:
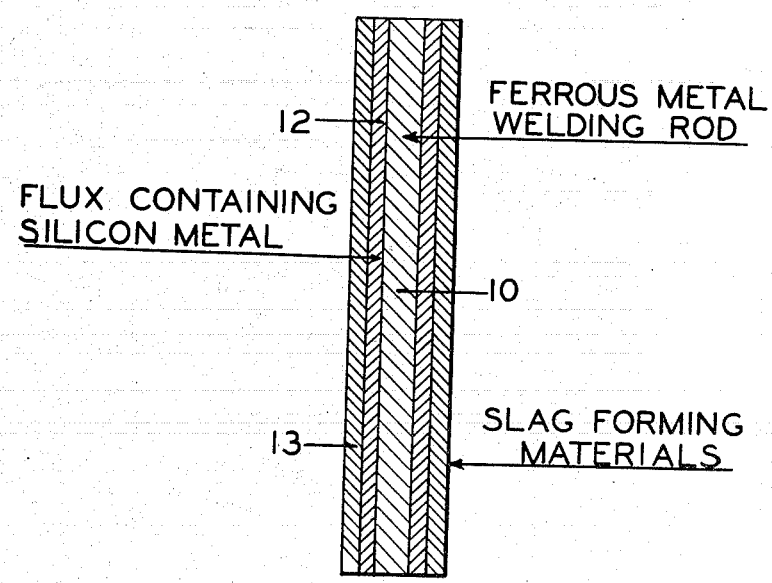

The flux of the invention may be applied to the portions of the work which are being welded, in the form of a powder or a paste, or it may be applied to the welding rod as a coat or sheath. Suitable forms of coated welding rods are shown in the accompanying drawing, in which Figure 1 is a longitudinal cross sectional view of a welding rod 10 and of a flux coat 11 containing silicon and slag forming materials, and Figure 2 is a longitudinal cross sectional view of a welding rod 10, of a flux coat 12 containing

TABLE A

| Composition of welding rod | | | | | | Method of welding | Composition of deposited weld metal | | |
|---|---|---|---|---|---|---|---|---|---|
| Percent Cr | Percent Ni | Percent Mn | Percent C | Percent Si | Percent Cb | | Percent Cb | Percent Si | Percent C |
| 18.39 | 8.95 | 0.54 | 0.06 | 0.17 | 0.72 | Oxyacetylene | 0.35 | 0.08 | 0.08 |
| | | | | | | Electric arc | .28 | -------- | .06 |
| 18.63 | 9.27 | .34 | .11 | .33 | 1.21 | Electric arc | .86 | 0.32 | .07 |
| 18.38 | 8.97 | .63 | .10 | .68 | 1.16 | Oxyacetylene | 1.06 | .52 | .09 |
| | | | | | | Electric arc | 1.09 | .58 | .08 |

Examination of these test results reveals that when the silicon content of the rod was only 0.17% about 50% of the columbium in the original rod was lost during welding. When the silicon content silicon, and of an adherent second flux coat 13 containing slag forming materials.

The results are given in the following table (B), in which all percentages and parts are by weight.

TABLE B

Composition of flux

| I | II | III |
|---|---|---|
| 30 parts feldspar<br>10 parts CaO<br>5 parts chrome ore<br>2½ parts dextrine | 30 parts feldspar<br>10 parts CaO<br>5 parts chrome ore<br>2½ parts dextrine<br>2½ parts silicon metal | 75 parts Ca-Mg silicate<br>10 parts clay<br>10 parts rutile<br>5 parts ferrosilicon (75% Si) |

The flux may be attached to the rod by forming an adhesive paste or adhesive glaze containing the flux, in which case the structure shown in Figure 1 is obtained; by placing a layer of flux next to the rod and covering this layer with an adherent paste or glaze, obtaining the structure shown in Figure 2; or by holding the flux onto the rod by a fabric sheath in known manner.

The body 10 of the rod is of ferrous metal and preferably contains chromium, carbon, and columbium. Nickel may be present in large amounts. Compositions which are recommended as especially useful comprise substantially:

|  | I | II |
|---|---|---|
| Chromium | 3% to 30% | 12% to 30%. |
| Nickel | Up to 5% | 5% to 30%. |
| Carbon | 0.01% to 0.3% | 0.01% to 0.3%. |
| Columbium | 0.1% to 3% | 0.1% to 3%. |
| Silicon | Up to 1% | Up to 1%. |
| Manganese | Up to 1% | Up to 1%. |
| Iron | The remainder | The remainder. |

Up to about 4% tantalum may also be present and a columbium content as high as 5% may be permitted for some purposes. The columbium content should be at least about four times, and is preferably at least eight to ten times, the carbon content. The columbium content preferably also exceeds the tantalum content. The usual small amounts of sulfur and phosphorus may be present.

Experiments which I have made demonstrate the efficacy of the flux of the invention. For example, welding rods containing about 18% chromium and about 8% nickel, and also containing by analysis 18.39% chromium, 8.95% nickel, 0.72% columbium, 0.17% silicon, and 0.06% carbon, were coated with silicon-containing flux and deposited by electric arc welding. The weld metal was then analyzed for columbium and carbon in each case. Rods of identical composition but having no silicon in their flux coats were similarly deposited by arc welding and the deposited metal was analyzed for comparison.

Welding tests

| Test No. | Per cent Cb in rod | Flux No. | Per cent Cb in weld metal | Recovery of Cb |
|---|---|---|---|---|
| 1 | 0.72 | I | 0.35 | 49% |
| 2 | .72 | II | .49 | 68% |
| 3 | .72 | II | .55 | 76% |
| 4 | .72 | III | .47 | 65% |

From the results shown in Table B it may readily be seen that the losses of columbium during welding may be reduced considerably by the use of the present invention. Similar results are obtainable in oxyacetylene welding.

Although specific proportions have been presented herein by way of example, it is obvious that other proportions may be used without departing from the invention. It is also clear that any material which is a strong reducing agent for columbium oxides under welding conditions, such as aluminum for example, may be substituted for all or a part of the silicon.

I claim:

1. A welding rod comprising a ferrous metal body containing columbium and a coat thereon, the said coat containing about 1% to 50% metallic silicon.

2. A welding rod comprising a ferrous metal body containing about 3% to 30% chromium, about 0.01% to 0.3% carbon, about 0.1% to 5% columbium, and up to about 1% silicon, and a coat on said body, said coat containing about 1% to 50% silicon.

3. A welding rod comprising a ferrous metal body containing about 12% to 30% chromium, about 5% to 30% nickel, about 0.01% to 0.3% carbon, about 0.1% to 5% columbium, and up to about 1% silicon, and a coat on said body, said coat containing about 1% to 50% silicon.

4. A welding rod comprising a ferrous metal body containing columbium and a coat thereon, the said coat containing slag forming materials, a binder, and about 1% to 50% silicon.

RUSSELL FRANKS.